United States Patent
Jeon

(10) Patent No.: US 9,191,484 B2
(45) Date of Patent: Nov. 17, 2015

(54) APPARATUS AND METHOD FOR WRITING MESSAGE IN MOBILE TERMINAL

(75) Inventor: Yong-Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1058 days.

(21) Appl. No.: 13/073,191

(22) Filed: Mar. 28, 2011

(65) Prior Publication Data

US 2011/0246931 A1   Oct. 6, 2011

(30) Foreign Application Priority Data

Apr. 2, 2010   (KR) .................. 10-2010-0030423

(51) Int. Cl.
G06F 3/00 (2006.01)
H04M 1/725 (2006.01)
G06F 17/30 (2006.01)
G06F 3/0483 (2013.01)

(52) U.S. Cl.
CPC ......... *H04M 1/72552* (2013.01); *G06F 3/0483* (2013.01); *G06F 17/30899* (2013.01); *H04M 2250/70* (2013.01)

(58) Field of Classification Search
CPC ..................... G06F 17/30056; H04N 1/00198
USPC ................................. 715/730, 800
See application file for complete search history.

(56) References Cited

U.S. PATENT DOCUMENTS

| | | | |
|---|---|---|---|
| 7,711,722 B1 * | 5/2010 | Sahasi et al. .................. 707/705 |
| 7,743,331 B1 * | 6/2010 | Fleischer et al. .............. 715/731 |
| 8,539,379 B2 * | 9/2013 | Skwarecki et al. ........... 715/854 |
| 8,635,287 B1 * | 1/2014 | Shih et al. ..................... 709/206 |
| 8,700,717 B2 * | 4/2014 | Buchheit et al. .............. 709/206 |
| 2005/0034077 A1 * | 2/2005 | Jaeger ........................... 715/732 |
| 2005/0114798 A1 * | 5/2005 | Jiang et al. .................... 715/864 |
| 2005/0147385 A1 * | 7/2005 | Takahashi et al. ............. 386/69 |
| 2006/0156218 A1 * | 7/2006 | Lee ............................ 715/500.1 |
| 2006/0259875 A1 * | 11/2006 | Collins et al. ................. 715/853 |
| 2007/0204238 A1 * | 8/2007 | Hua et al. ...................... 715/838 |
| 2007/0266324 A1 * | 11/2007 | Chailleux ..................... 715/730 |
| 2008/0005234 A1 * | 1/2008 | Newnam Giardino et al. ............................ 709/204 |
| 2008/0005668 A1 * | 1/2008 | Mavinkurve et al. ......... 715/526 |
| 2008/0010614 A1 * | 1/2008 | Lee ............................... 715/843 |
| 2008/0189647 A1 * | 8/2008 | Tapuska ........................ 715/781 |
| 2009/0019369 A1 * | 1/2009 | Borovsky et al. ............. 715/736 |
| 2009/0172547 A1 * | 7/2009 | Sparr ............................ 715/730 |
| 2009/0327938 A1 * | 12/2009 | Faraday et al. ............... 715/764 |
| 2010/0037140 A1 * | 2/2010 | Penner et al. ................. 715/732 |

(Continued)

FOREIGN PATENT DOCUMENTS

| | | |
|---|---|---|
| CN | 1770844 A | 5/2006 |
| CN | 101505326 A | 8/2009 |

(Continued)

*Primary Examiner* — Ryan Pitaro
(74) *Attorney, Agent, or Firm* — Jefferson IP Law, LLP

(57) ABSTRACT

A method and an apparatus for writing a message in a mobile terminal are provided. A method and an apparatus for simplifying movement between slides (pages) by changing the form of a slide into a collapse form when making messages that use a plurality of slides (pages) in a mobile terminal are provided. The apparatus includes a slide compressor and a message manager. The slide compressor converts an expanded slide including a message input field into a collapse slide. The message manager controls the slide compressor, and processes to output the slide converted by the slide compressor.

18 Claims, 4 Drawing Sheets

(56) References Cited

U.S. PATENT DOCUMENTS

| | | |
|---|---|---|
| 2010/0064019 A1* | 3/2010 | Sylthe et al. ............... 709/206 |
| 2010/0218099 A1* | 8/2010 | van Melle et al. ........... 715/730 |
| 2010/0222107 A1* | 9/2010 | Wassingbo ................... 455/566 |
| 2010/0229127 A1* | 9/2010 | Williams ...................... 715/854 |
| 2011/0093793 A1* | 4/2011 | Ryu .............................. 715/752 |
| 2011/0263298 A1* | 10/2011 | Park ............................. 455/566 |
| 2012/0089916 A1* | 4/2012 | Maaniitty et al. ............ 715/732 |
| 2012/0131464 A1* | 5/2012 | Penner et al. ................. 715/732 |
| 2013/0198602 A1* | 8/2013 | Kokemohr .................... 715/233 |
| 2014/0173442 A1* | 6/2014 | Yu et al. ....................... 715/732 |

FOREIGN PATENT DOCUMENTS

| | | |
|---|---|---|
| WO | 2009/109657 A2 | 9/2009 |
| WO | WO 2009109657 A2 * | 9/2009 |

* cited by examiner

APPARATUS AND METHOD FOR WRITING MESSAGE IN MOBILE TERMINAL

PRIORITY

This application claims the benefit under 35 U.S.C. §119 (a) of a Korean patent application filed in the Korean Intellectual Property Office on Apr. 2, 2010 and assigned Serial No. 10-2010-0030423, the entire disclosure of which is hereby incorporated by reference.

BACKGROUND OF THE INVENTION

1. Field of the Invention

The present invention relates to an apparatus and a method for writing a message in a mobile terminal. More particularly, the present invention relates to an apparatus and a method for simplifying movement between slides (pages), by changing the form of a slide into a collapse form, when making messages that use a plurality of slides (pages) in a mobile terminal.

2. Description of the Related Art

Mobile terminals have rapidly become widely distributed and used as they provide convenience in portability. Therefore, service providers (terminal manufacturers) competitively develop new mobile terminals having more convenient functions in order to improve the product and thereby attract users.

For example, a mobile terminal provides functions such as a phonebook, a game, a scheduler, a Short Message Service (SMS), a Multimedia Message Service (MMS), a Broadcast Message Service (BMS), an Internet service, an Electronic (E)-mail service, a morning call, a Motion Picture Expert Group (MPEG)-1 or MPEG-2 Audio Layer-3 (MP3) player, a digital camera, and other similar products and services.

Here, a multimedia message allows a user to write messages up to twenty slides (pages) at the maximum, generally, and allows message writing of up to approximately 2000 characters in each slide, so that the multimedia message function has become a function favored by a plurality of users.

When writing a large amount of messages, a user of the mobile terminal writes messages by adding a slide. That is, the mobile terminal supports twenty slides at the maximum but outputs one or two slides in a limited display portion, and then shows successive slides according to a user's page change request. This is because the mobile terminal provides an expanded type slide.

After writing messages using all of the twenty slides, the user must move to a relevant slide using a slide turnover button (e.g., +, − button) of the mobile terminal in order to view messages written on the relevant slide.

However, in this case, much time is taken for moving to the relevant slide, and the user may accidentally press a neighboring different key while repeatedly pressing the slide turnover button.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for simplifying a message writing process in a mobile terminal.

Another aspect of the present invention is to provide an apparatus and a method for providing a collapse type slide when writing messages that use a plurality of slides in a mobile terminal.

Still another aspect of the present invention is to provide an apparatus and a method for converting a collapse type slide into an expanded type slide when the collapse type slide is selected in a mobile terminal.

Yet another aspect of the present invention is to provide an apparatus and a method for providing contents of a relevant slide as one line of information when providing a collapse type slide in a mobile terminal.

In accordance with an aspect of the present invention, an apparatus for writing a message in a mobile terminal is provided. The apparatus includes a slide compressor for converting an expanded slide including a message input field into a collapse slide, and a message manager for controlling the slide compressor and for processing to output the slide converted by the slide compressor.

In accordance with another aspect of the present invention, a method for writing a message in a mobile terminal is provided. The method includes converting an expanded slide including a message input field into a collapse slide, and outputting the converted slide.

In accordance with still another aspect of the present invention, a method for writing a message in a mobile terminal is provided. The method includes writing a message in a message input field of a plurality of slides, compressing a slide on which the message has been written, and incorporating slide information into the compressed slide, wherein the compressing slide is expanded or collapsed according to a user's selection.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
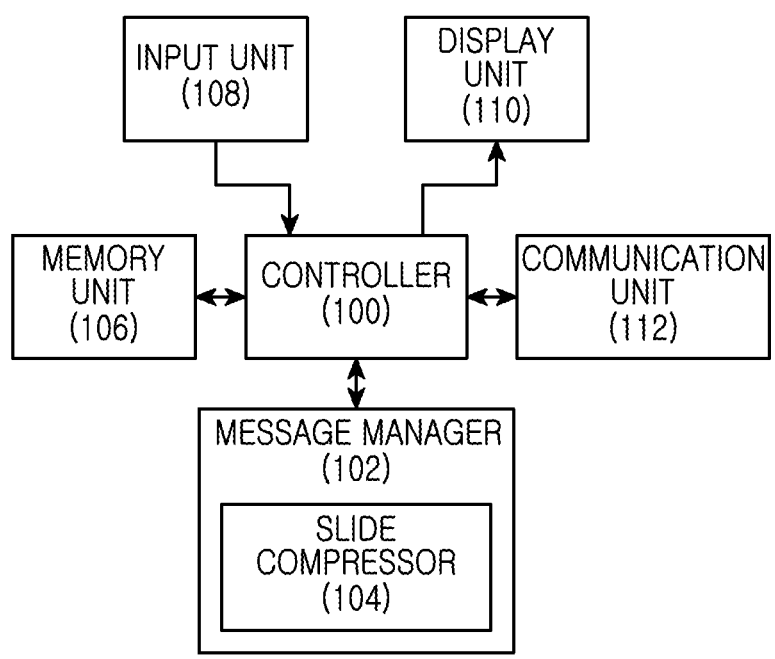
FIG. 1 is a block diagram illustrating a mobile terminal that converts a form of a message write slide according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for simplifying a message writing process of a mobile terminal by providing a collapse type slide when writing a message that uses a plurality of slides, and when the collapse type slide is selected, converting the collapse type slide into an expanded type slide in the mobile terminal.

FIGS. 1 through 4B, discussed below, and the various exemplary embodiments used to describe the principles of the present disclosure in this patent application are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a mobile terminal that converts a form of a message write slide according to an exemplary embodiment of the present invention.

Referring to FIG. 1, the mobile terminal includes a controller 100, a message manager 102, a memory unit 106, an input unit 108, a display unit 110, and a communication unit 112. The message manager 102 may further include a slide compressor 104. However, the mobile terminal may include additional units that are not illustrated here merely for sake of clarity. Similarly, the functionality of two or more of the above noted units may be integrated into a single component.

The controller 100 controls an overall operation of the mobile terminal. For example, the controller 100 performs processes and controls for voice communication and data communication. In addition to the general functions, according to an exemplary embodiment of the present invention, the controller 100 processes to simplify the form of a slide including a message writing field when writing a message. For example, the controller 100 processes to output a plurality of collapse slides representing information regarding the slides as one line information in order to output a plurality of slides on one screen, and to output a slide selected by a user in an expanded form. The slide converted into the expanded form according to the user's selection outputs a message writing field on the screen so that the user may write a message.

The message manager 102 can compress an expanded type slide to convert the same into a collapse type slide, and conversely, can convert a collapse type slide into an expanded type slide, under control of the controller 100. The message manager 102 may control the slide compressor 104 to process this operation.

Furthermore, when converting the expanded type slide into the collapse type slide, the message manager 102 provides information of a relevant slide (e.g., a slide number, and message summary information included in a slide) together to allow a user to understand contents written on the relevant slide.

The slide compressor 104 of the message manger 102 processes to convert the form of the slide into a collapse type slide or into an expanded type slide under control of the message manager 102.

The memory unit 106 may include Read Only Memory (ROM), Random Access Memory (RAM), a flash ROM, or other similar storage devices. The ROM stores microcodes of programs for processes and controls of the controller 100 and of the message manager 102, and various reference data.

The RAM serves as a working memory of the controller 100 and stores temporary data that occurs during execution of various programs. In addition, the flash ROM stores various updatable data for storage such as a phonebook, calling messages, received messages, information of a user's touch input point, and other similar data.

The input unit 108 includes a plurality of function keys such as numerical key buttons of 0 to 9, a menu button, a cancel button, an OK button, a TALK button, an END button, an Internet access button, navigation key buttons, letter input keys, and other similar input keys and buttons. The input unit 108 provides key input data (e.g., a message write request) corresponding to a key pressed by a user to the controller 100.

The display unit 110 displays status information generated during an operation of the mobile terminal, a limited number of letters, a large amount of moving images and still images, etc. The display unit 110 may be a color Liquid Crystal Display (LCD), an Active Mode Organic Light Emitting Diode (AMOLED) display, and other similar display apparatuses. The display unit 110 may include a touch input device, and when it is applied to a touch input type mobile terminal, it can be used as the input unit 108.

The communication unit 112 transmits/receives a Radio Frequency (RF) signal of data input/output via an antenna (not illustrated). For example, during transmission, the communication unit 112 channel-codes and spreads data to be transmitted, and performs an RF process on the signal to transmit the signal. During reception, the communication unit 112 converts a received RF signal into a baseband signal, and despreads and channel-decodes the baseband signal to recover data.

The function of the message manager 102 may be performed by the controller 100 of the mobile terminal. The separate configuration and illustration of the message manager 102 are for an exemplary purpose only for convenience in description, not for limiting the scope of the present invention. It would be obvious to those skilled in the art that various modifications to this exemplary embodiment may be made within the scope of the present invention. For example, all functions of the message manager 102 may be processed by the controller 100.

Figure 2:
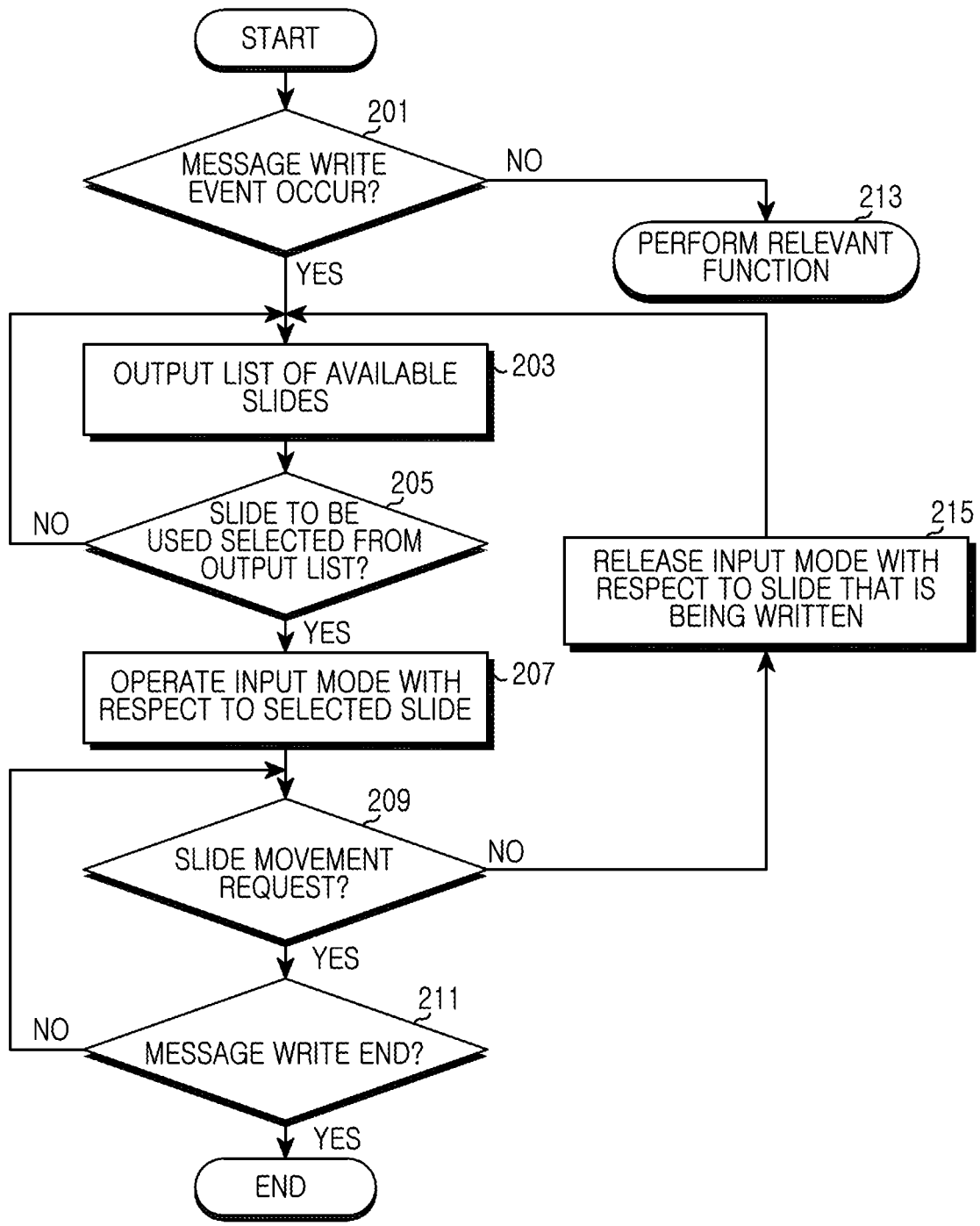
FIG. 2 is a flowchart illustrating a process for performing message writing in a mobile terminal according to an exemplary embodiment of the present invention.

FIG. 2 is a flowchart illustrating a process for performing message writing in a mobile terminal according to an exemplary embodiment of the present invention.

Referring to FIG. 2, the mobile terminal determines whether a message write event occurs in step 201. Here, the message write event denotes message writing that uses a plurality of slides (pages), such as a multimedia message.

If it is determined in step 201 that the message write event does not occur, the mobile terminal proceeds to step 213 to perform a relevant function (e.g., an idle mode).

In contrast, if it is determined in step 201 that the message write event occurs, the mobile terminal proceeds to step 203 to output a list of available slides. At this point, the mobile terminal outputs the number of the slide to allow a user to conveniently perform movement to a slide which the user desires to write or modify.

The mobile terminal determines whether a slide to be used is selected from the output list in step 205.

If it is determined in step 205 that a slide to be used has not been selected by the user, the mobile terminal re-performs the process of step 203.

In contrast, if it is determined in step 205 that the slide to be used has been selected by the user, the mobile terminal proceeds to step 207 to operate in an input mode with respect to the slide selected in step 205.

Here, the mobile terminal outputs a plurality of slides, and according to an exemplary embodiment of the present invention, the mobile terminal outputs only slide information without expanding an entire slide, in order to simplify movement between slides.

For example, a mobile terminal of the related art outputs the conventional expanded slide in the form of a slide formed of information such as the number of the slide, and then expands only a slide selected by a user in the form of the conventional slide. Here, the expanded slide is defined as a state that outputs a message write field allowing message writing of an allowed range, and the slide form formed of information such as the slide number is defined as a collapse slide in the form of an icon.

The mobile terminal determines whether a slide movement request by a user occurs in step 209. Here, the slide movement request is to select a different slide for successive message writing from a plurality of slides output in a collapse form in order to write a message on the different slide following the slide that is currently being written.

If it is determined in step 209 that the slide movement request occurs, the mobile terminal proceeds to step 215 to release an input mode with respect to the slide currently being written and re-performs the process of step 203. That is, the mobile terminal releases the input mode by changing the expanded slide that is being written into a collapse slide.

In contrast, if it is determined in step 209 that the slide movement request does not occur, the mobile terminal proceeds to step 211 to determine whether the message writing ends.

If it is determined in step 211 that the message writing does not end, the mobile terminal re-performs the process of step 209.

In contrast, if it is determined in step 211 that the message writing ends, the mobile terminal ends the present algorithm.

Figure 3:
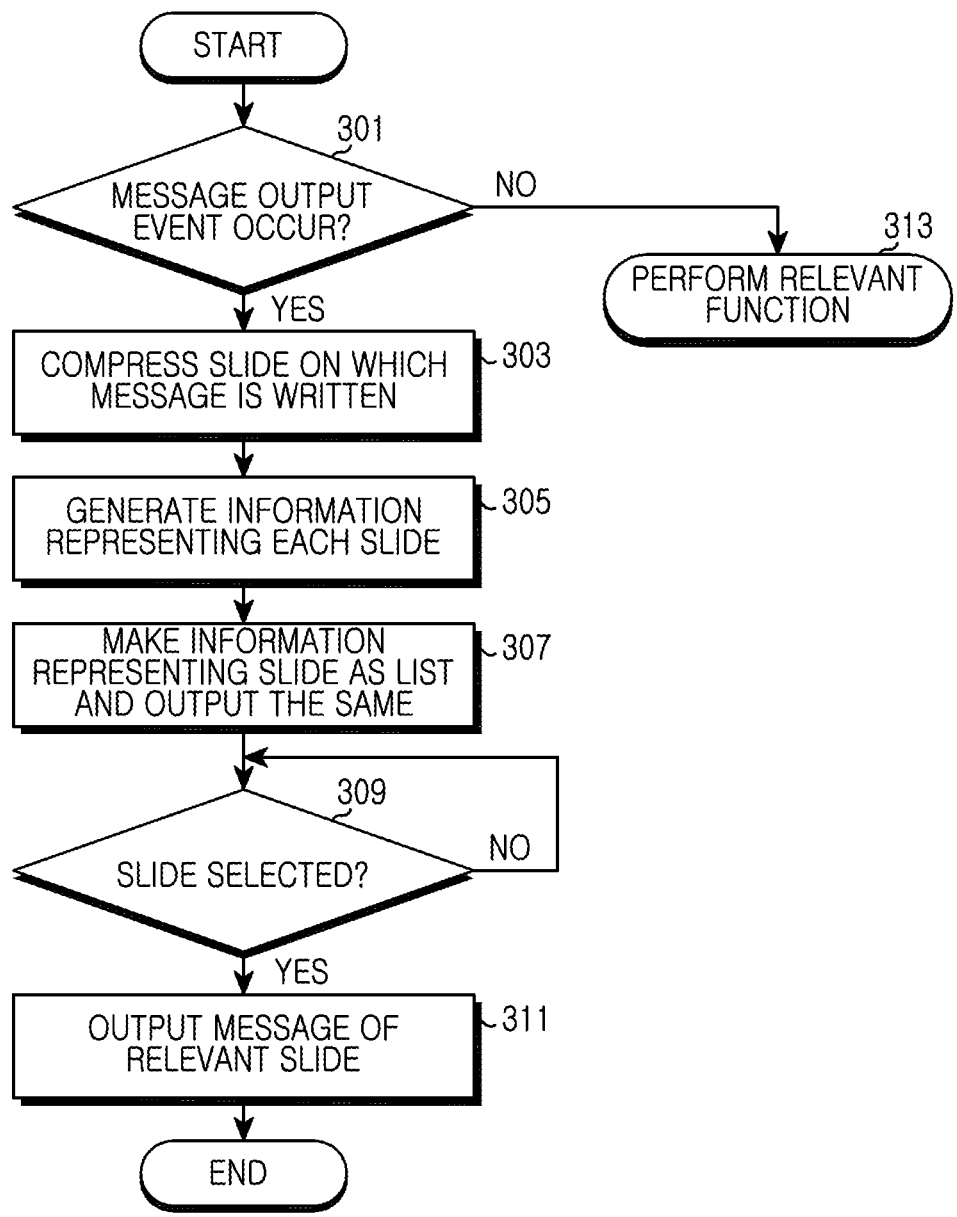
FIG. 3 is a flowchart illustrating a process for outputting a message in a mobile terminal according to an exemplary embodiment of the present invention.

FIG. 3 is a flowchart illustrating a process for outputting a message in a mobile terminal according to an exemplary embodiment of the present invention.

Referring to FIG. 3, the mobile terminal determines whether a message output event occurs in step 301. Here, as described above, the message output event denotes an event for outputting a message formed of a plurality of slides (pages).

If it is determined in step 301 that the message output event does not occur, the mobile terminal proceeds to step 313 to perform a relevant function (e.g., an idle mode).

In contrast, if it is determined in step 301 that the message output event occurs, the mobile terminal proceeds to step 303 to compress a slide on which a message is written, and then proceeds to step 305 to generate information representing each slide.

Here, according to this exemplary embodiment of the present invention, the mobile terminal compresses a message of a message write field, and generates information representing a relevant slide such as a relevant slide number, a message summary of the relevant slide, a message first line of the relevant slide, etc. in order to convert an expanded type slide into a collapse type slide.

The mobile terminal makes a list of information representing the slide and outputs the same in step 307.

Therefore, the mobile terminal outputs slide information regarding a plurality of slides on one screen to allow a user to select a desired slide and to move to the relevant slide.

The mobile terminal determines whether a slide has been selected by a user in step 309.

If it is determined in step 309 that a slide has not been selected by the user, the mobile terminal re-performs the process of step 309.

In contrast, if it is determined in step 309 that the slide has been selected by the user, the mobile terminal proceeds to step 311 to output the message of the slide selected in step 309. In other words, the mobile terminal converts the collapse type slide selected in step 309 into an expanded type slide to output the message included in the relevant slide.

When detecting different slide selection by the user after converting the slide into an expanded type slide, the mobile terminal converts the output slide into the collapse type slide and then converts the newly selected collapse type slide into the expanded type slide. In addition, according to an exemplary embodiment of the present invention, if a mobile terminal having a display unit of a sufficiently large size converts the slide into the expanded type slide and then detects selection of a different slide by the user, the mobile terminal may maintain the expanded type slide that is currently being output and may simultaneously convert the newly selected collapse type slide into an expanded type slide.

After that, the mobile terminal ends the present algorithm.

Figures 4A, 4B:
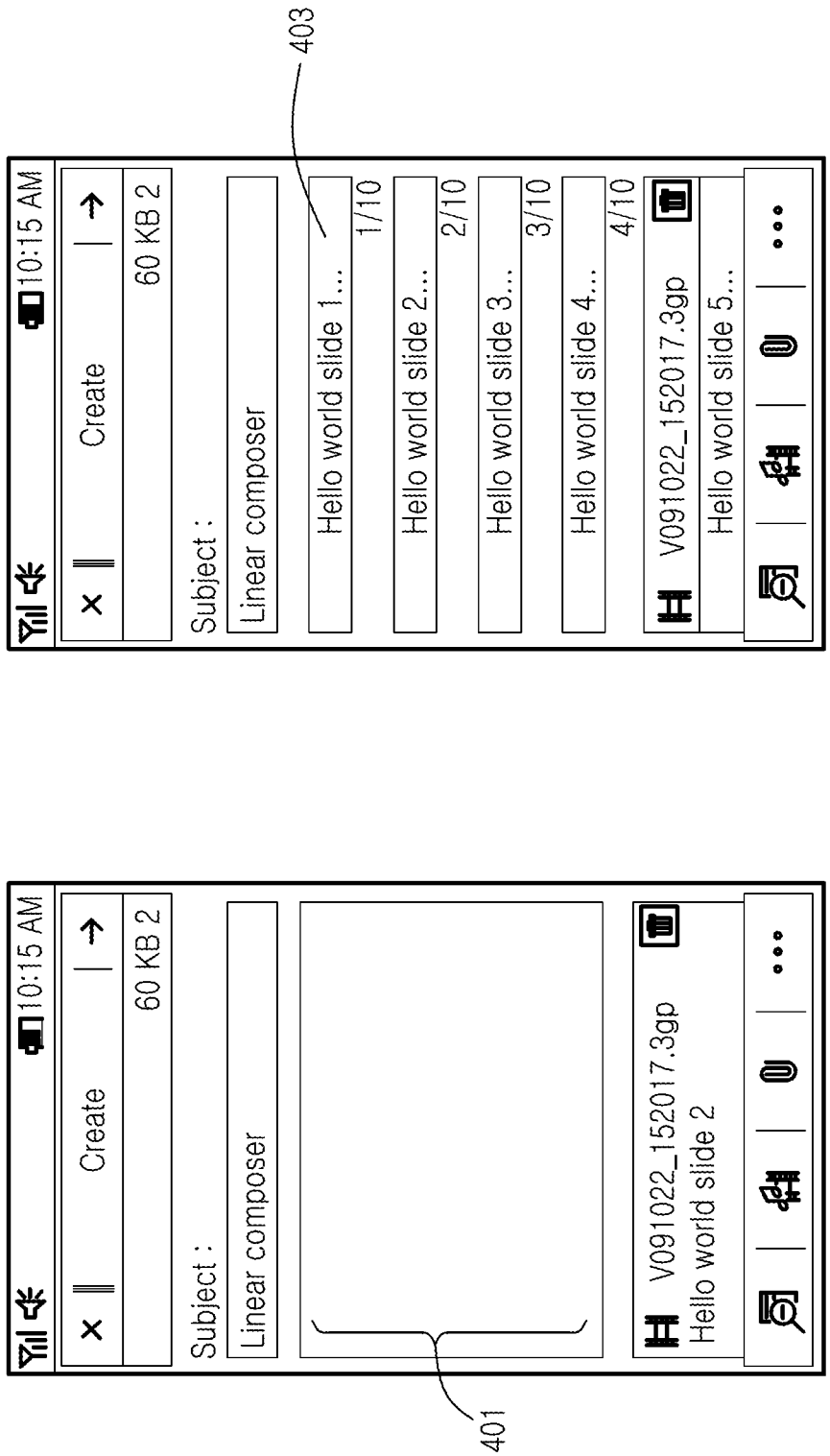
FIG. 4A is a view illustrating a message writing screen (message output screen) in a mobile terminal according to the related art.
FIG. 4B is a view illustrating a message writing screen (message output screen) in a mobile terminal according to an exemplary embodiment of the present invention.

FIGS. 4A and 4B are views comparing a message write screen (message output screen) of a mobile terminal according to an exemplary embodiment of the present invention with a message write screen (message output screen) of a mobile terminal of the related art.

FIG. 4A is a view illustrating a message writing screen (message output screen) in a mobile terminal according to the related art.

Referring to FIG. 4A, the mobile terminal of the related art outputs a message write screen (message output screen) that uses a plurality of slides (pages) such as a multimedia message.

The multimedia message is exemplarily described. Generally, the multimedia message allows message writing up to twenty slides (pages) at the maximum, and allows text writing up to 2000 letters at the maximum in each slide.

In the case where an amount of messages written on a message input field 401 of a slide is large, a user adds a slide and writes a message. That is, the mobile terminal supports twenty slides at the maximum but may output only two slides at the maximum at a time, as illustrated in a limited display unit. This is because the mobile terminal of the related art outputs an expanded type slide.

After writing a message using all of the twenty slides, to view the message written on an intermediate slide, a user must move to the relevant slide using a slide turnover button (e.g., +, − button) of the mobile terminal.

However, in this case, much time is taken for moving to the relevant slide.

FIG. 4B is a view illustrating a message writing screen (message output screen) in a mobile terminal according to an exemplary embodiment of the present invention.

Referring to FIG. 4B, the mobile terminal outputs a plurality of slides as illustrated. At this point, according to an exemplary embodiment of the present invention, the mobile terminal supports a collapse type slide 403 and provides a plurality of (for example, five) collapse slides 403 at the maximum in a limited display as illustrated. Here, the collapse slide 403 may be configured in various forms such as a speech bubble, a label, etc.

Referring to the illustrated screen, in the case of moving to a twentieth slide that is supported at the maximum, the mobile terminal may show the twentieth slide through a small number (for example, four times) of paging changes.

The collapse slide 403 outputs only information (e.g., a slide number, and message summary written on a slide) of a relevant slide in the form of a collapse message write field, and then expands the message write field of the relevant slide only when the slide is selected by a user.

Therefore, the user of the mobile terminal may easily move to a desired slide, and may conveniently write a message on the relevant slide. Furthermore, the mobile terminal provides a line of slide information in the collapse slide 403, so that contents included in the relevant slide may be conveniently viewed.

As described above, exemplary embodiments of the present invention provide an apparatus and a method for simplifying a message writing process in a mobile terminal. The mobile terminal provides a collapse slide when writing a message that uses a plurality of slides, and when the collapse slide is selected, the mobile terminal converts the collapse slide into an expanded slide, so that movement between slides and selection of a slide to be written may be simply performed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for writing a message in a mobile terminal, the apparatus comprising:
    a display;
    at least one controller configured to control:
        a slide compressor for converting an expanded slide comprising a message input field into a collapse slide; and
        a message manager for controlling the slide compressor and for processing to output the slide converted by the slide compressor,
    wherein each slide comprises one of a plurality of pages of a same multimedia message,
    wherein each slide comprises text message writing up to a maximum number of characters,
    wherein the expanded slide comprises the contents of the one of the plurality of pages of the same multimedia message, and
    wherein the collapse slide comprises one-line information of a relevant slide.

2. The apparatus of claim 1, wherein after outputting the converted slide, the message manager converts a slide selected by a user into an expanded slide.

3. The apparatus of claim 2, wherein when a different slide is selected by a user after converting the slide into the expanded slide, the message manager converts the expanded slide into the collapse slide and converts the selected different slide into an expanded different slide.

4. The apparatus of claim 2, wherein when a different slide is selected by a user after converting the slide into the expanded slide, the message manager maintains the expanded slide and concurrently converts the selected different slide into an expanded different slide.

5. The apparatus of claim 1, wherein the one-line information of the relevant slide comprises at least one of a slide number, message summary information included in the relevant slide, and message first line contents of the relevant slide.

6. A method for writing a message in a mobile terminal, the method comprising:
    converting an expanded slide comprising a message input field into a collapse slide; and
    outputting the converted slide,
    wherein each slide comprises one of a plurality of pages of a same multimedia message,
    wherein each slide comprises text message writing up to a maximum number of characters,
    wherein the expanded slide comprises the contents of the one of the plurality of pages of the same multimedia message, and
    wherein the collapse slide comprises one-line information of a relevant slide.

7. The method of claim 6, further comprising, after outputting the converted slide, converting a slide selected by a user into an expanded slide.

8. The method of claim 7, further comprising:
    when a different slide is selected by a user after converting the slide into the expanded slide, converting the expanded slide into the collapse slide; and
    converting the selected different slide into an expanded different slide.

9. The method of claim 7, further comprising:
    when a different slide is selected by a user after converting the slide into the expanded slide, maintaining the expanded slide; and
    concurrently converting the selected different slide into an expanded different slide.

10. The method of claim 6, wherein the one line information of the relevant slide comprises at least one of a slide number, message summary information included in the relevant slide, and message first line contents of the relevant slide.

11. A method for writing a message in a mobile terminal, the method comprising:
    writing a message in a message input field of a plurality of slides;
    compressing at least one slide of the plurality of slides on which the message has been written; and
    incorporating slide information into the at least one compressed slide,
    wherein the at least one compressed slide is expanded or collapsed according to a user's selection, wherein each slide comprises one of a plurality of pages of a same multimedia message, wherein each slide comprises text message writing up to a maximum number of characters, wherein the expanded slide comprises the contents of the one of the plurality of pages of the same multimedia message, and wherein the collapsed slide comprises one-line information comprising the slide information of a relevant slide.

12. The method of claim 11, wherein the slide information comprises at least one of a slide number, message summary information included in the slide, and message first line contents of a relevant slide.

13. The method of claim 11, further comprising:
generating a list of the at least one compressed slide;
outputting only a selected slide among the list of the at least one compressed slide in a form of an expanded slide.

14. The method of claim 13, further comprising:
outputting at least one nonselected slide among the list of the at least one compressed slide in a form of a collapsed slide.

15. The method of claim 11, further comprising:
generating a list of the at least one compressed slide; and
when a different slide is selected while the slide is expanded, outputting the selected different slide in a form of an expanded different slide while maintaining the expanded slide.

16. The apparatus of claim 1, wherein the maximum number of pages of the multimedia message comprises twenty (20) pages, and wherein the maximum number of characters in each slide comprises two thousand (2000) characters.

17. The apparatus of claim 1, wherein the display concurrently displays up to a maximum number of collapse slides and up to a maximum number of expanded slides of the multimedia message.

18. The apparatus of claim 17, wherein a user pages through the maximum number of displayed collapse slides at a time.

* * * * *